United States Patent [19]

Rench

[11] Patent Number: 5,615,796
[45] Date of Patent: Apr. 1, 1997

[54] CONTAINER FOR HOT FOOD

[75] Inventor: Frederick A. Rench, Boise, Id.

[73] Assignee: Boise Cascade Corporation, Boise, Id.

[21] Appl. No.: 308,294

[22] Filed: Sep. 19, 1994

[51] Int. Cl.⁶ .................. B65D 5/20; B65D 5/56
[52] U.S. Cl. .............. 220/441; 220/418; 229/146; 229/906; 229/939; 229/940
[58] Field of Search .................. 229/146, 902, 229/906, 939, 940; 220/418, 441, 443; 493/346, 381; 156/201, 205, 207, 210, 292, 462, 472, 473, 554

[56] References Cited

U.S. PATENT DOCUMENTS

| | | | |
|---|---|---|---|
| 2,012,131 | 8/1935 | Kondolf | 220/441 |
| 2,547,005 | 4/1951 | Herrick et al. | 229/939 |
| 2,782,977 | 2/1957 | Thompson | 229/939 |
| 2,800,840 | 7/1957 | Herrick | 156/207 |
| 2,833,459 | 5/1958 | Greene | 229/939 |
| 4,059,220 | 11/1977 | Lorenz | 229/939 |
| 5,314,738 | 5/1994 | Ichikawa . | |

FOREIGN PATENT DOCUMENTS

| | | | |
|---|---|---|---|
| 5270541 | 10/1993 | Japan | 220/441 |
| WO87/05262 | 9/1987 | WIPO . | |
| 9209486 | 6/1992 | WIPO | 229/146 |

*Primary Examiner*—Gary E. Elkins
*Attorney, Agent, or Firm*—Klarquist Sparkman Campbell Leigh & Whinston, LLP

[57] ABSTRACT

A container for the temporary storage of foods is disclosed. The container includes a corrugated medium having a single backer paper thus creating an exposed corrugated surface on a side opposite the backer. The food container is formed such that the exposed corrugation is located towards an interior surface of the container. The corrugation is provided in a meandering, nonlinear pattern to provide strength along both longitudinal and transverse directions relative to the orientation of the corrugation. By using a corrugated medium having a single layer of backer paper, it is possible to construct the container using approximately one-third less materials without sacrificing strength.

2 Claims, 2 Drawing Sheets

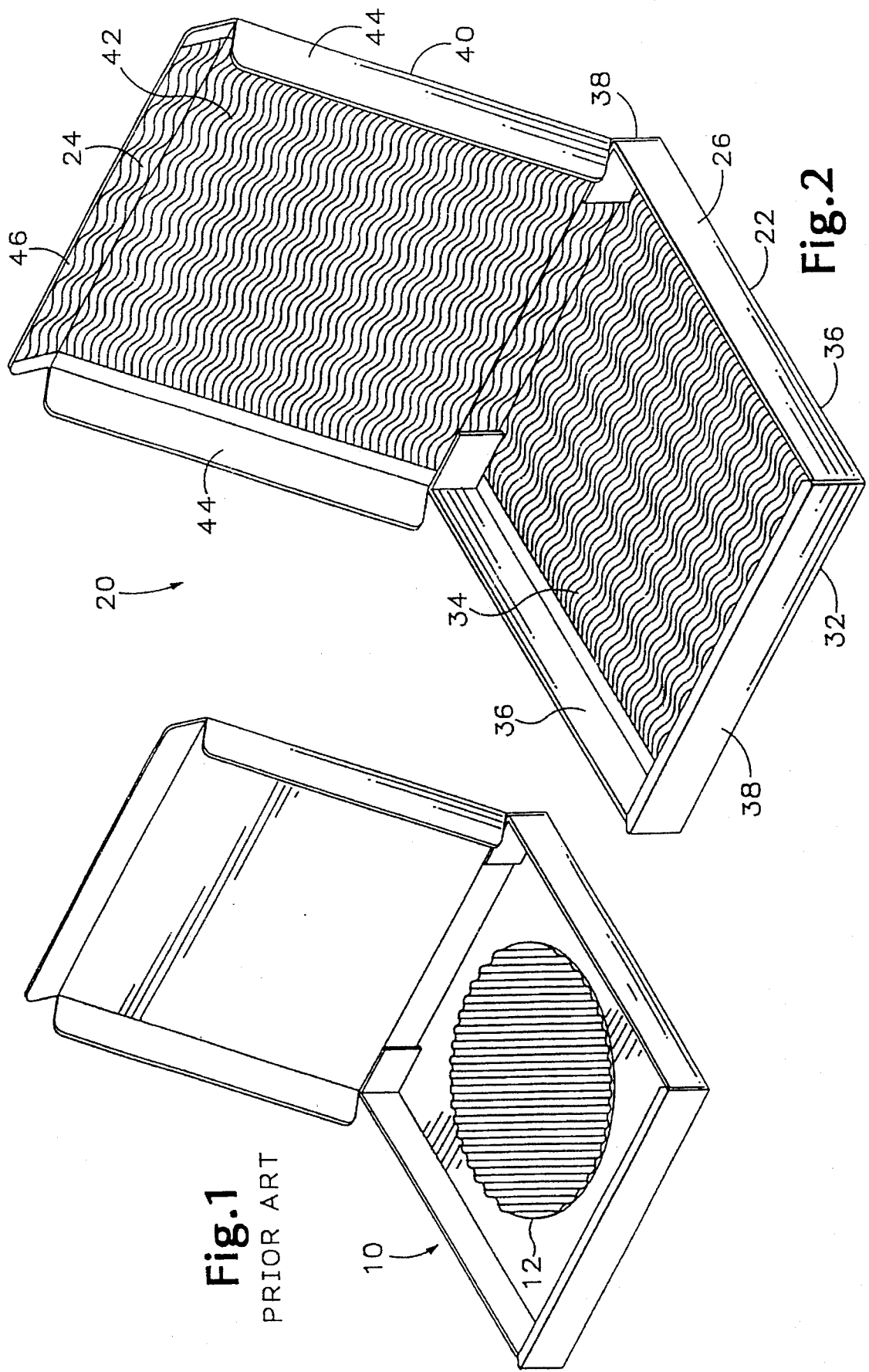

CONTAINER FOR HOT FOOD

BACKGROUND OF THE INVENTION

1. Field of the Invention

This invention pertains generally to the field of containers for temporary storage of hot food, including but not limited to pizzas, hot sandwiches, and other related items.

2. Description of the Related Art

FIG. 1 is an exemplary rendition of a prior-art container for hot food such as a pizza. The box includes a thin corrugated container 10 in which the material is comprised of small linear corrugations having a paper backer, or liner, adhesively affixed to both sides of the corrugations. The corrugated material is then cut and folded to create the enclosure 10. Many prior-art pizza boxes also include an insert pad 12 consisting of a corrugated sheet having large linear corrugations and paper backer, or liner, on a single side, thereby exposing, on one side, the ridges and furrows of the corrugations. When a pizza is placed on the exposed corrugations some air circulates underneath the pizza crust preventing it from getting soggy. The exposed corrugations also act as a receptacle for catching grease that may fall off the pizza, thereby preventing grease from soaking through the container. The pad also acts as an insulator, helping to keep the pizza hot during its transport in the container.

The prior-art containers provide a good container for temporary storage and transportation of hot foods such as pizzas. However, there is a continuing need to save resources by reducing the amount of materials used in constructing such containers.

SUMMARY OF THE INVENTION

The present invention provides a container for temporary storage of hot foods having many of the features and advantages of the prior-art containers but also having increased bidirectional rigidity and requiring fewer materials. The present invention uses meandering waveform corrugations (as opposed to the linear corrugations of the prior art) which increases strength of the container as compared to prior containers with conventional corrugations of the same size. And, because of the increased the bidirectional strength, it is possible to produce a corrugated container of adequate strength using waveform corrugated sheet material lined on only one side, known in the art as "single-face" material, rather than "double-face" corrugated sheets, as used in the prior art. Additionally, because the corrugated sheet is single-face, the meandering waveform corrugations are exposed along an inside surface of the box. Thus, air will flow beneath a pizza stored in the container, preventing it from getting soggy and insulating the container from heat loss so that the pizza does not cool too rapidly. Thus, the present invention saves the materials associated with a second layer of liner paper and also all the paper associated with the corrugated pad 12 noted in the prior-art description.

Various advantages and features of novelty which characterize the invention are particularized in the claims forming a part hereof. However, for a better understanding of the invention and its advantages, reference should be made to the drawings and to the accompanying description in which there is illustrated and described preferred embodiments of the invention.

BRIEF DESCRIPTION OF THE DRAWINGS

FIG. 1 is a perspective view showing a prior-art food container.

FIG. 2 is a perspective view showing a preferred embodiment of a food container of the present invention.

DETAILED DESCRIPTION OF THE PREFERRED EMBODIMENTS

Figure 3:
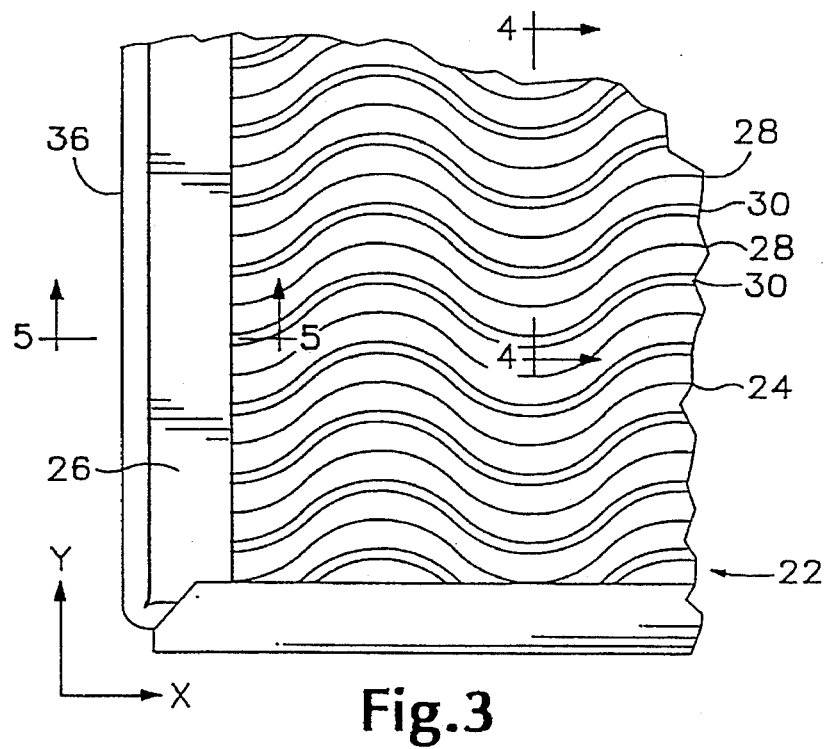
FIG. 3 is an enlarged detail plan view of a portion of the food container of FIG. 2.
Figure 4:
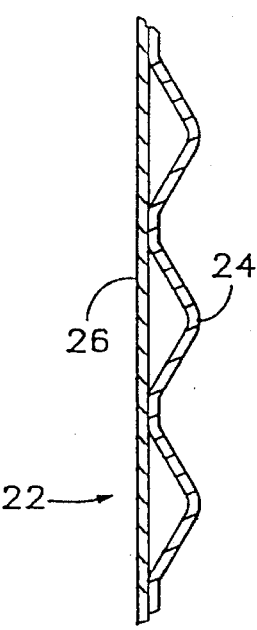
FIG. 4 is a longitudinal sectional view taken along line 4—4 in FIG. 3 showing the waveform corrugations in cross-section.

With particular reference to FIGS. 2–4, there is shown a preferred embodiment of a take-out hot food container 20 of the present invention. In FIG. 2, the container is shown in the general shape and dimension of a pizza box, but is to be understood that the principles of the invention would work equally well with alternatively shaped containers for temporary storage of other hot foods. The present invention is particularly adapted to hot foods because of its insulating qualities and its ability to absorb fluids, such as grease, normally associated with hot foods.

The container 20 is fabricated of a corrugated sheet 22. The sheet includes meandering waveform corrugations 24 made of paper and a paper backer or liner 26. The corrugations 24 include elongate ridges 28 and furrows 30 that are approximately parallel and evenly spaced. The ridges and furrows undulate along their longitudinal direction.

The construction of, and dimensions associated with, the meandering corrugations of the present invention are disclosed in U.S. Pat. No. 5,314,738, incorporated herein by reference.

Prior-art corrugations consist of linear, longitudinal ridges and furrows of various sizes which offer satisfactory strength against bending about a transverse axis, but offer very little strength when bent about a longitudinal axis, parallel to the corrugations. Corrugated sheets with linear corrugations are particularly weak when of single-face material, that is, lined on one side only so that the corrugations are exposed.

With respect to the reference axes x and y shown in FIG. 3, it will be noted that the corrugations 24, of the present invention provides stiffness against bending about axes parallel to both the x and y axes, even when single-face material is used, or even when the corrugated medium is unlined. As shown in the preferred embodiments, the meandering corrugations 24 are longitudinally aligned along the x direction and undulate along the y direction about an axis parallel to the x axis.

As shown in FIG. 2, the single-face corrugated sheet 22 of the present invention is formed into the shape and dimension of a pizza box. The box includes a base 32 having a bottom panel 34, lateral sides 36 and end sides 38. The box also includes a lid 40 having a top panel 42, lateral sides 44 and flap 46. The box is formed such that the side of the corrugated sheet 22 having the exposed corrugations 24 is located along the interior surfaces of the box enclosure 20. By locating the exposed corrugations 24 on the inside surface, the present invention eliminates need for an insert pad 12 associated with prior art container 10.

Preferably, the sheet 22 is formed such that the liner 26 extends beyond the corrugated medium 24 along the lateral sides 36 and 44. Thus, the liner 26 may be folded back over the lateral sides 36 and 44 and along the corrugations 24 to provide double-face corrugated sheet along the lateral sides, thereby strengthening the enclosure 20.

Figures 5, 6:
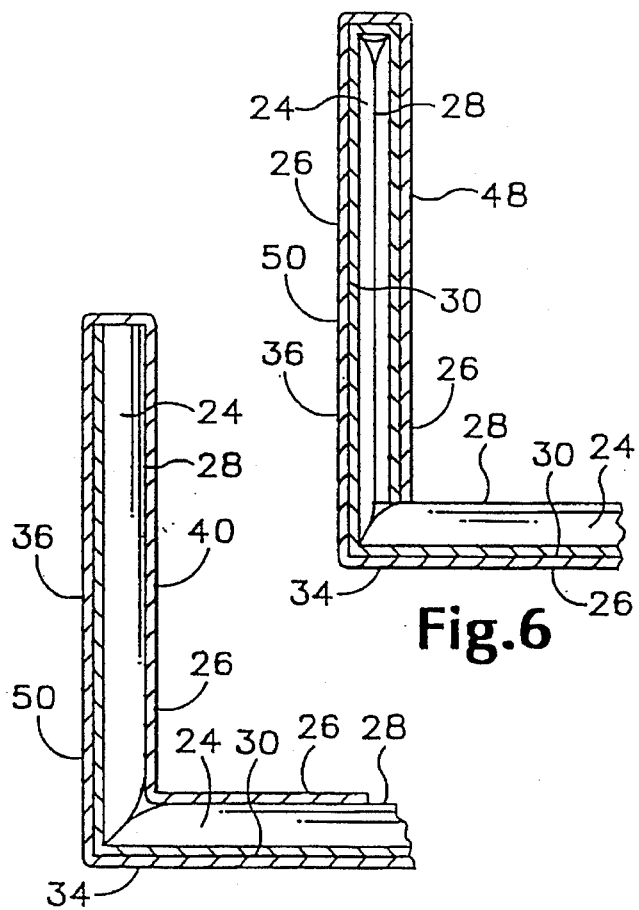
FIG. 5 is a cross-sectional view taken along line 5—5 in FIG. 3 showing detail of lateral sides of the container of FIG. 2.
FIG. 6 is a cross-sectional view taken along line 5—5 of FIG. 3 showing an alternative embodiment of the container's lateral sides in which a portion of the corrugation is crushed.

FIG. 5 shows a cross-section of the lateral sides 36 in which the liner 26 is folded back over the corrugated medium 24 and adhered to ridges 28 to form the double-face corrugation along lateral sides 36. The liner 26 may also be sized so that it extends a short distance onto the inside of the bottom panel 34, also as shown in FIGS. 2 and 5, thereby providing additional stiffening along the side edges of such panel. Although not shown, the lateral sides 44 are formed in a similar manner.

Alternatively, the lateral sides 36 may be formed by crushing a portion of the corrugation 24 as is most clearly seen in FIG. 6. In this embodiment, a folded-over portion 48 is crushed along a width approximately equal to the height of the lateral side 36 so that the ridges 28 are pressed approximately flat with the furrows 30. Thereafter, the crushed portion is folded over and adhered to form the lateral side 36. The lateral sides 44 may be formed in a similar manner.

Figure 7:
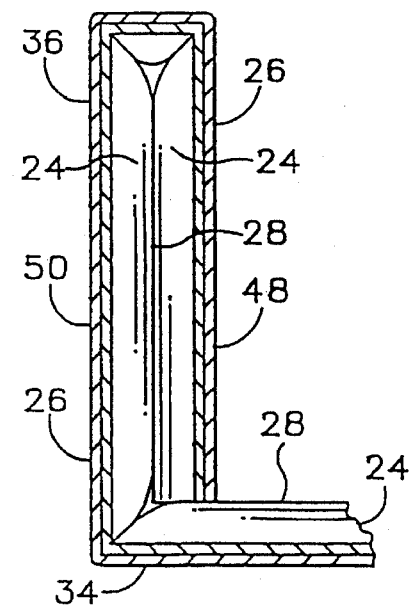
FIG. 7 is a cross-sectional view taken along line 5—5 of FIG. 3 showing another alternative embodiment of the lateral sides wherein the side surface is applied to itself without crushing the corrugation.

Alternatively, the lateral sides 36 and 44 may be formed as shown in FIG. 7 wherein the liner 26 is cut the same size as the corrugation 24 and the sides are fabricated simply by folding over.

In all embodiments, the folded-over portion 48 may be adhered to upright portion 50 or it may be held in place by means of tabs that extend through the bottom panel 34.

Numerous characteristics and advantages of the invention have been set forth in the foregoing description, together with details of the structure and function of the invention. The novel features hereof are pointed out in the appended claims. The disclosure is illustrative only, and changes may be made in detail, especially in matters of shape, size, direction of rotation and arrangement of parts within the principle of the invention to the full extent indicated by the broad general meaning of the terms in the claims.

I claim:

1. A pizza box, comprising:
    (a) a base having a bottom and two sides; and
    (b) a lid having a top and sides;
    (c) wherein the base includes meandering corrugation and further including lateral sides having a plurality of layers of corrugation each layer having a liner on one side thereof and having no liner between the layers.

2. The pizza box of claim 1 wherein the corrugation of at least one of the plurality of layers of corrugation is at least partially crushed.

* * * * *